US010414504B2

(12) United States Patent
Roderwald et al.

(10) Patent No.: US 10,414,504 B2
(45) Date of Patent: Sep. 17, 2019

(54) AIRCRAFT SEAT MOUNTING DEVICE (71) Applicant: RECARO Aircraft Seating GmbH & Co. KG, Schwaebisch Hall (DE)

(72) Inventors: Martin Roderwald, Fort Worth, TX (US); Thomas Drenzeck, Michelfeld (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 494 days.

(21) Appl. No.: 15/104,678

(22) PCT Filed: Dec. 16, 2014

(86) PCT No.: PCT/EP2014/077995
§ 371 (c)(1),
(2) Date: Jun. 15, 2016

(87) PCT Pub. No.: WO2015/091507
PCT Pub. Date: Jun. 25, 2015

(65) Prior Publication Data
US 2016/0340045 A1 Nov. 24, 2016

(30) Foreign Application Priority Data
Dec. 16, 2013 (DE) .................. 10 2013 114 130

(51) Int. Cl.
*A47B 97/00* (2006.01)
*B64D 11/06* (2006.01)
(52) U.S. Cl.
CPC .......... *B64D 11/0696* (2013.01); *B64D 11/06* (2013.01); *B64D 11/0606* (2014.12); *B64D 11/0649* (2014.12); *Y02T 50/46* (2013.01)

(58) Field of Classification Search
CPC ............ B64D 11/0606; B64D 11/0696; B64D 11/0649; B64D 11/06; Y02T 50/46
(Continued)

(56) References Cited

U.S. PATENT DOCUMENTS 4,911,381 A * 3/1990 Cannon .............. B64D 11/0696
244/122 R
5,152,578 A 10/1992 Kiguchi
(Continued)

FOREIGN PATENT DOCUMENTS

DE 69019456 T2 9/1995
DE 102009014720 A1 9/2010
(Continued)

OTHER PUBLICATIONS

Search Report dated Oct. 6, 2014 issued in corresponding DE patent application No. 10 2013 114 130.7 (and partial English translation).
(Continued)

*Primary Examiner* — Gwendolyn W Baxter
(74) *Attorney, Agent, or Firm* — Posz Law Group, PLC (57) ABSTRACT An aircraft seat mounting device with at least one carrier profile, with at least one aircraft seat element and with at least one intermediate element, which at least substantially encompasses the at least one carrier profile and is coupled to the at least one aircraft seat element.

The intermediate element is arranged rotatably with respect to the carrier profile at least in case of crash/deformation.

19 Claims, 4 Drawing Sheets (58) Field of Classification Search
USPC .............. 248/503.1; 297/216.2, 326
See application file for complete search history.

(56) References Cited

U.S. PATENT DOCUMENTS

| | | | |
|---|---|---|---|
| 5,522,640 A | | 6/1996 | Bilezikjian |
| 5,553,923 A | | 9/1996 | Bilezikjian |
| 5,657,950 A | * | 8/1997 | Han .................. B64D 11/06 244/122 R |
| 5,730,492 A | * | 3/1998 | Warrick .............. B60N 2/4221 297/216.2 |
| 2012/0091780 A1 | | 4/2012 | Mueller |
| 2012/0098322 A1 | | 4/2012 | Mueller |

FOREIGN PATENT DOCUMENTS

| | | |
|---|---|---|
| DE | 102009014721 A1 | 10/2010 |
| DE | 102012020032 A1 | 4/2014 |
| EP | 0 423 348 A1 | 4/1997 |
| FR | 2148929 A5 | 3/1973 |

OTHER PUBLICATIONS

International Search Report of the International Searching Authority dated Mar. 3, 2015 issued in the corresponding International application No. PCT/EP2014/077995 (and English translation).

International Preliminary Report on Patentability dated Jun. 21, 2016 issued in the corresponding International application No. PCT/EP2014/077995 (and English translation).

Office Action dated Mar. 20, 2017 issued in corresponding CN patent application No. 201480075645.X (and English summary).

Office Action dated Jul. 10, 2019 issued in corresponding EP patent application No. 14 814 838.0 (and English translation thereof).

* cited by examiner

AIRCRAFT SEAT MOUNTING DEVICE

CROSS REFERENCE TO RELATED APPLICATIONS

This application is a U.S. national stage application of PCT/EP2014/077995 filed on Dec. 16, 2014, which is based on German Patent Application No. 10 2013 114 130.7 filed on Dec. 16, 2013, the contents of which are incorporated herein by reference.

STATE OF THE ART

The invention relates to an aircraft seat mounting device.

An aircraft seat mounting device with at least one carrier profile, with at least one aircraft seat element and with at least one intermediate element, which at least substantially encompasses the at least one carrier profile and is coupled to the at least one aircraft seat element, has already been proposed.

The objective of the invention is in particular to make a generic device available having improved characteristics regarding a weight and a robustness. The objective is achieved according to the invention and advantageous implementations and further developments of the invention described and claimed herein.

Advantages of the Invention

The invention is based on an aircraft seat mounting device with at least one carrier profile, with at least one aircraft seat element and with at least one intermediate element, which at least substantially encompasses the at least one carrier profile and is coupled to the at least one aircraft seat element.

It is proposed that the intermediate element is arranged rotatably with respect to the carrier profile at least in case of crash/deformation. By an "aircraft seat mounting device" is herein in particular a device to be understood which forms a part of an aircraft seat, in particular a part by means of which the aircraft seat is mounted on a cabin floor. Herein the aircraft seat mounting device is provided for transferring forces which have been introduced into the aircraft seat during operation, e.g. a weight force of a person sitting on the aircraft seat, into the cabin floor. Herein a "carrier profile" is to be understood, in particular, as an element of an aircraft seat, in particular a part of a frame of the aircraft seat, the carrier profile being preferably embodied as a cross tube running in parallel to a transverse direction of the seat. The carrier profile is herein preferably part of a plurality of aircraft seats which are arranged in an aircraft seat row one beside the other. An "aircraft seat element is herein to be in particular understood as a part of the aircraft seat implementing a supporting part of the aircraft seat. A seat element herein transfers and passes on forces coming up during operation. Herein the aircraft seat element is preferably embodied as a seat divider or a seat leg. By an "intermediate element" is herein in particular an element to be understood which is arranged between two elements, in particular between at least one aircraft seat element and the carrier profile, said two elements being coupled to each other via the intermediate element. "At least substantially encompassing" is herein to mean in particular that the intermediate element encompasses the carrier profile at least by more than 180 degrees, preferably by more than 270 degrees and in an especially advantageous implementation completely. The phrasing that two elements are "coupled" to each other is herein to mean, in particular, that the two elements, like in particular the intermediate element and the aircraft seat element, are fixedly connected to each other, and thus fixedly positioned with respect to each other, wherein the two elements may be connected to each other in a rigid but alternatively in an articulate fashion. Herein one of the elements preferably comprises a connection ram, via which the other element is connected to the one element. Principally it is also conceivable that the two elements are coupled to each other directly, e.g. via an adhesive bonding or a welding connection or via another substance-to-substance bond that is deemed expedient by a person having ordinary skill in the art. A "crash case" is herein to be in particular understood as an overload case, i.e. an operating state in which forces acting onto the aircraft seat mounting device and/or onto the aircraft seat which the aircraft seat mounting device is a part of are greater than forces resulting from normal load in usual flight operation. In this way the aircraft seat element can be connected via the intermediate element in an especially advantageous and simple fashion, and in case of a crash forces can be transferred via the intermediate element particularly easily without creating an additional torsional load on the carrier profile, as a result of which the carrier profile can be in particular implemented having an especially advantageous low weight.

It is further proposed that the aircraft seat mounting device comprises at least one further aircraft seat element, which is coupled to the intermediate element. This allows particularly advantageously coupling the two aircraft seat elements to each other, forces being transferred between the two aircraft seat elements.

Furthermore it is proposed that the aircraft seat element is embodied as a seat divider. A "seat divider" is to be understood in particular as a structural part of an aircraft seat row with at least two aircraft seats which are arranged laterally adjacent, the structural part being arranged at least substantially above at least one carrier profile, in particular a single beam and/or a cross tube, with respect to a vertical direction oriented vertically to a mounting plane of the aircraft seat row. In particular, the seat divider is a rigidly implemented structural part of the aircraft seat row. Preferably the seat divider is arranged regarding the vertical direction at least substantially above a seat bottom of a respective aircraft seat of the at least two laterally adjacently arranged aircraft seats of the aircraft seat row. The seat divider is in particular provided for storing an arm support unit. Preferentially the seat divider is provided for allowing a belt connection. Preferably the seat divider forms a lateral delimitation of at least one of the at least two aircraft seats which are arranged laterally adjacent, wherein the seat divider may be arranged aisle-side and/or wall-side and/or forms a delimitation between two laterally adjacently arranged aircraft seats of the at least two aircraft seats. This allows implementing the aircraft seat element in a particularly advantageous manner.

It is moreover proposed that the aircraft seat element is embodied as a seat leg. A "seat leg" is herein in particular to be understood as an element connecting the aircraft seat to a cabin floor on which the aircraft seat is mounted which the aircraft seat mounting device is a part of, the seat leg being preferably connected to the cabin floor via a connecting element at a lower end and being coupled to the carrier profile at an upper end. This allows especially advantageously connecting the seat leg of the aircraft seat to the carrier profile.

Furthermore it is proposed that the intermediate element comprises at least one connection ram, via which the aircraft seat element is coupled to the intermediate element. A "connection ram" is herein in particular to be understood as an element comprising at least one receptacle for fastening a further element, e.g. in particular the aircraft seat element. This allows connecting the aircraft seat element to the intermediate element particularly easily and advantageously.

It is also proposed that the connection ram is coupled to the intermediate element via substance-to-substance bond. By "coupled via substance-to-substance bond" is in particular to be understood that mass particles of the elements to be coupled are held together by atomic or molecular forces, e.g. by soldering, welding, adhesive bonding and/or vulcanization. In this way the connection ram can be coupled to the intermediate element in a particularly simple, cost-effective and reliable manner.

Further it is proposed that the connection ram has, in a connection region with the intermediate element, an extension in a circumferential direction which is less than 180 degrees. By a "connection region" is herein in particular a region to be understood in which the connection ram is connected to the intermediate element. In this way the connection ram can be implemented in a particularly advantageous and space-saving manner, wherein in particular at least two connection rams can advantageously be arranged in a same circumferential region. In this way elements, e.g. in particular aircraft seat elements, which are connected to the connection rams, can be connected to the intermediate element especially advantageously in a plane.

It is furthermore proposed that the at least one intermediate element is fixated at least in an axial direction with respect to the carrier profile. By an "axial direction" is herein in particular a direction to be understood which corresponds to the main extension direction of the carrier profile. The axial direction is herein preferably oriented transversely to a seating direction. In this way the intermediate element and thus the aircraft seat elements connected to the intermediate element may be advantageously positioned for operation.

Moreover it is proposed that the intermediate element is arranged in a torque-proof fashion with respect to the carrier profile at least in one operating state. The term "torque-proof" is herein in particular to mean that the intermediate element is not rotatable with respect to the carrier profile. This allows particularly advantageously coupling the intermediate element to the carrier profile for a normal operating state.

Further it is proposed that the intermediate element is fixedly connected to the carrier profile by means of an adhesive bond at least in one operating state. This allows advantageously connecting the intermediate element to the carrier profile in a particularly easy and cost-effective fashion.

It is also proposed that the carrier profile is at least substantially made of a light metal and/or of a fiber-composite material. The term "at least substantially made of a light metal" is herein to mean, in particular, that the carrier profile is implemented of a light metal by at least 60%, preferably by at least 80% and in an especially advantageous implementation completely. A "light metal" is herein to be understood in particular as a metal having a density of less than 5 g/cm$^3$, like in particular an aluminium, titane or magnesium. Herein other aircraft seat elements, e.g. a seat divider or a seat leg, may also be made of these materials. This allows implementing the carrier profile in a particularly lightweight fashion.

Furthermore it is proposed that the aircraft seat mounting device comprises at least one second intermediate element, wherein respectively only one aircraft seat element is coupled to one of the two intermediate elements. By a "further intermediate element" herein in particular an additional intermediate element is to be understood, which differs and is embodied separate from the one intermediate element. In this way the two aircraft seat elements can be coupled to the carrier profile via respectively one separate intermediate element in a particularly advantageous manner.

It is moreover proposed that the aircraft seat mounting device comprises at least one further aircraft seat element, which is directly coupled to the carrier profile.

Herein "coupled" is in particular to mean fixedly connected to each other, the aircraft seat element being preferably rigidly connected to the carrier profile. This allows coupling the one aircraft seat element to the carrier profile in a particularly advantageous manner.

The aircraft seat mounting device according to the invention is herein not to be limited to the application and implementation form described above. In particular, for the purpose of fulfilling a functionality herein described, the aircraft seat mounting device according to the invention may comprise a number of respective elements, structural components and units that differs from a number herein mentioned.

DRAWINGS

Further advantages may become apparent from the following description of the drawings. In the drawings four exemplary embodiments of the invention are shown. The drawings, the description and the claims contain a plurality of features in combination. The person having ordinary skill in the art will purposefully also consider the features separately and will find further expedient combinations.

It is shown in.

DESCRIPTION OF THE EXEMPLARY EMBODIMENTS

Figure 1:
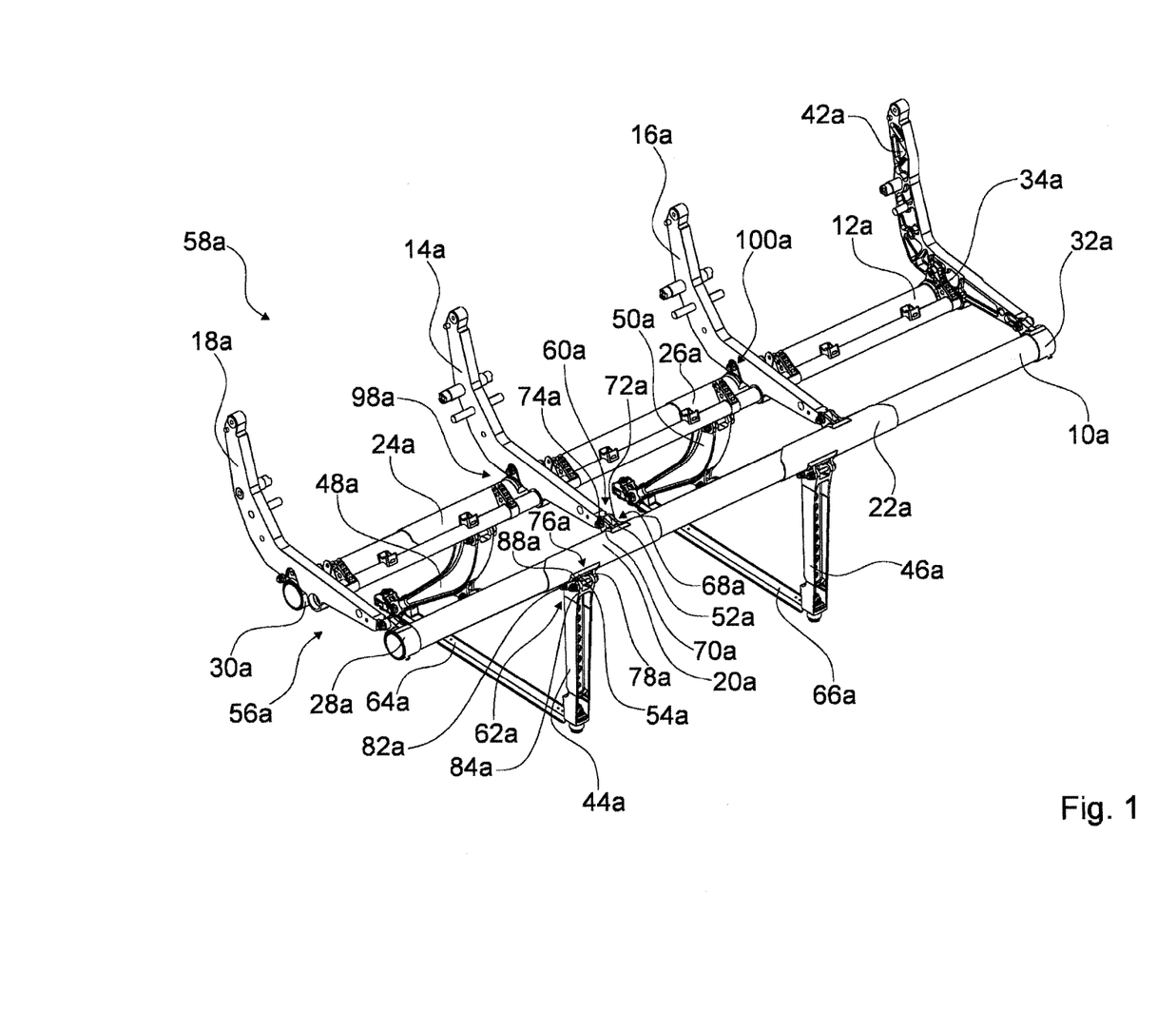
FIG. 1 a schematic presentation of an aircraft seat mounting device according to the invention in a first exemplary embodiment, FIG. 2 a detail view of a carrier profile, an intermediate element and aircraft seat elements, which are connected to the intermediate element, of the aircraft seat mounting device according to the invention, FIG. 3 a section view through the carrier profile and the intermediate element, FIG. 4 a schematic presentation of an aircraft seat mounting device according to the invention in a second exemplary embodiment, FIG. 5 a schematic presentation of an aircraft seat mounting device according to the invention in a third exemplary embodiment, and FIG. 6 a schematic detail view of a carrier profile, an intermediate element and its connection rams of an aircraft seat mounting device according to the invention in a fourth exemplary embodiment.
Figure 2:
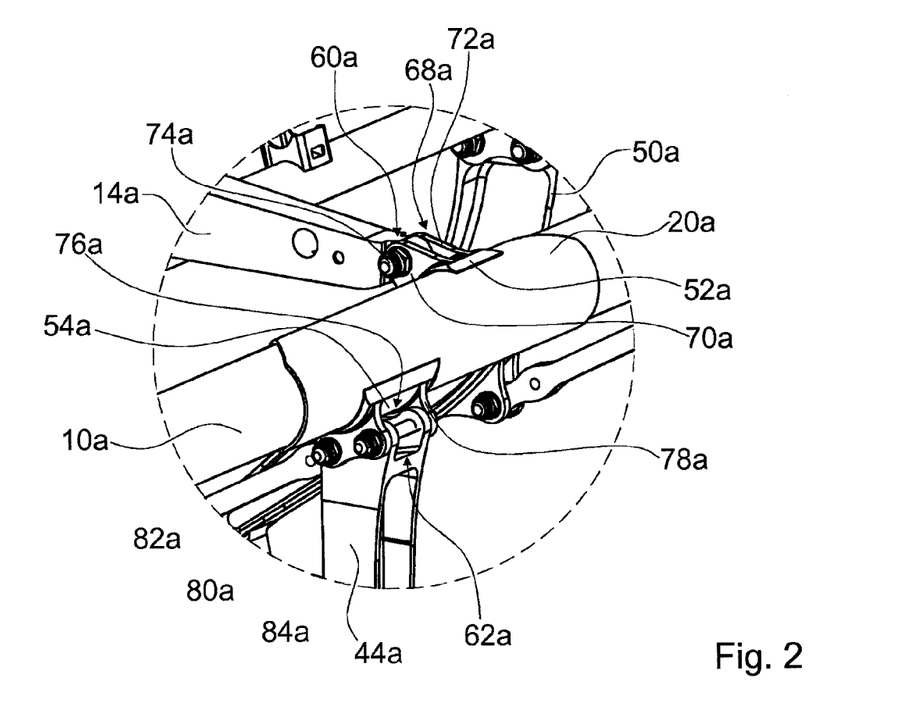
Figure 3:
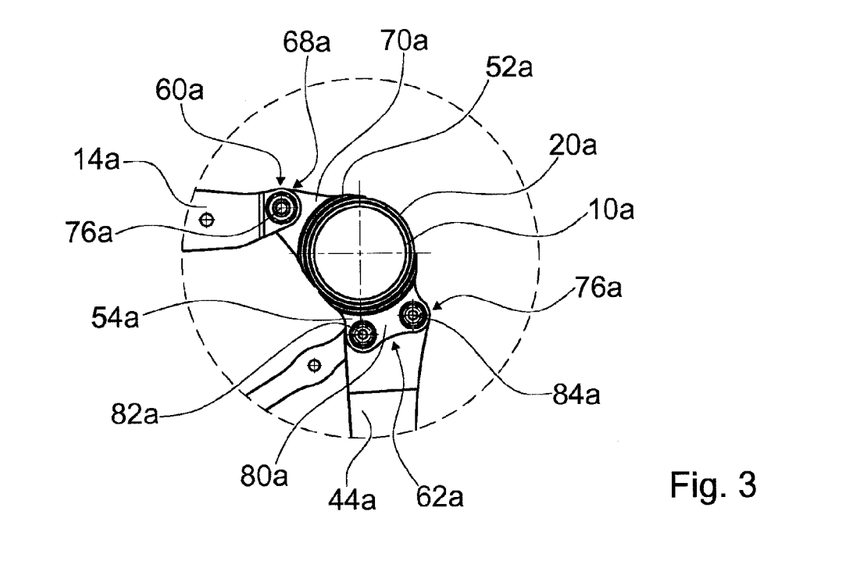

FIGS. 1 to 3 show a first exemplary embodiment of an aircraft seat mounting device according to the invention. The aircraft seat mounting device is part of an aircraft seat row 56a, which is only partly shown. The aircraft seat row 56a herein comprises three aircraft seats 58a. Principally it is also conceivable that the aircraft seat row 56a comprises a different number of aircraft seats 58a, e.g. only one or two, or four aircraft seats 58a. The aircraft seats 58a are provided for flight passengers to sit down on them during a flight. Herein the aircraft seats 58a respectively comprise a seat bottom and a backrest, which are not shown in detail.

Furthermore each aircraft seat 58a is laterally delimited by respectively one armrest, which is not shown in detail. Herein each two directly adjacent aircraft seats 58a comprise a shared armrest. The aircraft seats 58a are provided for being mounted on a mounting plane. The mounting plane is herein embodied by a cabin floor of an aircraft. In a mounted state the aircraft seats 58a are mounted on the cabin floor by means of the aircraft seat mounting device.

The aircraft seat mounting device comprises a first carrier profile 10a. The first carrier profile 10a is embodied as a front transversal tube. The aircraft seat mounting device further comprises a second carrier profile 12a. The second carrier profile 12a is embodied as a rear transversal tube. The two carrier profiles 10a, 12a are arranged spaced apart from each other and run in parallel to each other. The carrier profile 10a which is embodied as a front transversal tube is herein arranged in a front region of the aircraft seats 58a. The second carrier profile 12a which is embodied as a rear transversal tube is arranged in a rear region of the aircraft seats 58a. The carrier profiles 10a, 12a herein extend in a transversal direction to the aircraft seats 58a. The transversal direction of the aircraft seats 58a is herein oriented at a right angle to a seating direction.

The two carrier profiles 10a, 12a embodied as transversal tubes are embodied substantially identically, which is why in the following only the first carrier profile 10a is described, which is embodied as a front transversal tube. A description of the first carrier profile 10a may herein be referred to for elucidating the second carrier profile 12a which is embodied as a rear transversal tube. The carrier profile 10a embodied as a transversal tube is implemented tube-shaped. The carrier profile 10a has a cross section forming an annulus. Herein the carrier profile 10a is embodied thin-walled. The carrier profile 10a is implemented of a fiber-composite material. Principally it is also conceivable that the carrier profile 10a is made of a light metal, e.g. an aluminium or magnesium.

The aircraft seat mounting device comprises four first aircraft seat elements 14a, 16a, 18a, 42a. The first aircraft seat elements 14a, 16a, 18a, 42a are each embodied as a seat divider. The first aircraft seat elements 14a, 16a, 18a, 42a embodied as seat dividers respectively delimit a seat region of an aircraft seat 58a. Herein respectively two neighboring aircraft seat elements 14a, 16a, 18a, 42a embodied as seat dividers delimit an aircraft seat 58a of the aircraft seat row 56a. The two exteriorly located aircraft seat elements 18a, 42a embodied as seat dividers delimit the aircraft seat row 56a to the outside. The aircraft seat elements 14a, 16a, 18a, 42a are embodied L-shaped and extend in a mounted state from the first carrier profile 10a which is embodied as a front transversal tube to the second carrier profile 12a which is embodied as a rear transversal tube. In the mounted state the aircraft seat elements 14a, 16a, 18a, 42a embodied as seat dividers extend from the first carrier profile 10a which is embodied as a front transversal tube to a rear of the second carrier profile 12a which is embodied as a rear transversal tube. In a region behind the second carrier profile 12a which is embodied as a rear transversal tube, the first aircraft seat elements 14a, 16a, 18a, 42a embodied as seat dividers have a bend, starting from which the aircraft seat elements 14a, 16a, 18a, 42a extend from the carrier profiles 10a, 12a upwards, away from the mounting plane. Herein the first aircraft seat elements 14a, 16a, 18a, 42a embodied as seat dividers are each coupled to the carrier profile 12a embodied as the rear cross tube. Respectively at a front end of the first aircraft seat elements 14a, 16a, 18a, 42a embodied as seat dividers, these are each coupled to the carrier profile 10a embodied as the front cross tube. For this purpose the first aircraft seat elements 14a, 16a, 18a, 42a embodied as seat dividers respectively comprise a receptacle 60a at their front end. The receptacle 60a is herein embodied by a through-hole.

The aircraft seat elements 14a, 16a, 18a, 42a embodied as seat dividers are provided for further structural components of the aircraft seats 58a respectively of the aircraft seat row 56a that is to be mounted, in particular armrests and/or backrests. The first aircraft seat elements 14a, 16a, 18a, 42a embodied as seat dividers are made of a light metal, like in particular an aluminium. Herein the two exterior first aircraft seat elements 18a, 42a embodied as seat dividers are implemented differently from the two interior first aircraft seat elements 14a, 16a embodied as seat dividers. Principally it is also conceivable that the aircraft seat elements 14a, 16a, 18a, 42a are all implemented identically and/or of a different material, like e.g. a fiber-composite material. Depending on a number of aircraft seats 58a in the aircraft seat row 56a, it may principally also be possible that the aircraft seat mounting device comprises a different number of aircraft seat elements 14a, 16a, 18a, 42a embodied as seat dividers.

The aircraft seat mounting device comprises four second aircraft seat elements 44a, 46a, 48a, 50a. The second aircraft seat elements 44a, 46a, 48a, 50a are herein each embodied as a seat leg. The second aircraft seat elements 44a, 46a, 48a, 50a embodied as seat legs are provided for mounting the aircraft seat mounting device and thus the aircraft seat row 56a onto the mounting plane. Herein the two second aircraft seat elements 44a, 46a are implemented as front seat legs and the other two second aircraft seat elements 48a, 50a are implemented as rear seat legs. The second aircraft seat elements 44a, 46a embodied as front seat legs are in a mounted state coupled to the first carrier profile 10a which is embodied as the front cross tube. The second aircraft seat elements 48a, 50a embodied as rear seat legs are in a mounted state coupled to the second carrier profile 12a which is embodied as the rear cross tube. Herein the second aircraft seat elements 44a, 46a, 48a, 50a are respectively coupled to the respective carrier profile 10a, 12a with an upper end. For connecting to the respective carrier profile 10a, 12a the second aircraft seat elements 44a, 46a, 48a, 50a respectively comprise a receptacle 62a at an upper end. The receptacles 62a are herein each embodied by two through-holes. At a lower end the second aircraft seat elements 44a, 46a, 48a, 50a embodied as seat legs respectively comprise connecting elements, which are not shown nor described in detail, via which the second aircraft seat elements 44a, 46a, 48a, 50a embodied as seat legs can be connected to connecting elements that are arranged in the cabin floor. The connecting elements of the cabin floor are herein preferably implemented as connecting rails. The connecting elements of the second aircraft seat elements 44a, 46a, 48a, 50a embodied as seat legs are implemented as fittings engaging in a form-fit fashion into the connecting elements that are implemented as connecting rails for mounting the aircraft seat row 56a. Principally it is also conceivable that the second aircraft seat elements 44a, 46a, 48a, 50a embodied as seat legs comprise differently embodied connecting elements which fasten the second aircraft seat elements 44a, 46a, 48a, 50a fixedly on a cabin floor in a different fashion. The two second aircraft seat elements 44a, 46a embodied as front seat legs are implemented as substantially straight profiles extending in a mounted state from the first carrier profile 10a downwards substantially perpendicularly. The two second aircraft seat elements 48a, 50a embodied as rear seat legs are implemented as curved profiles extending from the second carrier profile 12*a* downwards as well as rearwards, i.e. away from the first carrier profile 10*a*. Herein respectively one of the second aircraft seat elements 44*a*, 46*a* embodied as a front seat leg is oriented in parallel to one of the second aircraft seat elements 48*a*, 50*a* embodied as a rear seat leg. The second aircraft seat element 44*a*, 46*a* embodied as a front seat leg and the second aircraft seat element 48*a*, 50*a* embodied as a rear seat leg, which are oriented parallel with respect to each other, are respectively connected to each other via a connecting rod 64*a*, 66*a* at a lower end. Principally it is also conceivable that two aircraft seat elements 44*a*, 46*a*, 48*a*, 50*a*, which are arranged parallel with respect to each other and are embodied as seat legs, or all aircraft seat elements 44*a*, 46*a*, 48*a*, 50*a* which are embodied as seat legs are integrally implemented as a one-piece seat leg.

The aircraft seat mounting device comprises a first intermediate element 20*a* and a second intermediate element 22*a*. The intermediate elements 20*a*, 22*a* completely encompass the first carrier profile 10*a* which is embodied as a front cross tube. Principally it would also be conceivable that the intermediate elements 20*a*, 22*a* only partly encompass the first carrier profile 10*a* in a circumferential direction. The intermediate elements 20*a*, 22*a* are herein implemented as tube elements. The intermediate elements 20*a*, 22*a* which are implemented as tube elements are herein made of a fiber-composite material. Principally it is also conceivable that the intermediate elements 20*a*, 22*a* are made of another material, like preferably a light metal, e.g. an aluminium. The first intermediate element 20*a* is coupled to the first aircraft seat element 14*a* which is embodied as a seat divider. Moreover the first intermediate element 20*a* is connected to the one second aircraft seat element 44*a* which is embodied as a front seat leg. The first intermediate element 20*a* is provided for connecting the first aircraft seat element 14*a* embodied as a seat divider and the second aircraft element embodied as a front seat leg to the first carrier profile 10*a* which is implemented as a front cross tube. Via the first intermediate element 20*a* the first aircraft seat element 14*a* and the second aircraft seat element 44*a* are connected to the first carrier profile 10*a*. The second intermediate element 22*a* is provided for connecting the other first aircraft seat element 16*a* embodied as a seat divider and the other second aircraft seat element 46*a* embodied as a front seat leg to the first carrier profile 10*a* which is implemented as a front cross tube. Via the second intermediate element 22*a* the first aircraft seat element 16*a* and the second aircraft seat element 46*a* are connected to the first carrier profile 10*a*. An implementation of the first intermediate element 20*a* and the second intermediate element 22*a* as well as a connection of the respective first aircraft seat element 14*a*, 16*a* and the respective second aircraft seat element 44*a*, 46*a* to the corresponding intermediate element 20*a*, 22*a* are identical, which is why in the following merely the first intermediate element 20*a* and the connection of the respective first aircraft seat element 14*a* and the respective second aircraft seat element 44*a* to the intermediate element 20*a* will be described. An implementation of the second intermediate element 22*a* and a connection of the corresponding aircraft seat elements 16*a*, 46*a* to said intermediate element 22*a* may herein be gathered from the description of the first intermediate element 20*a*.

The intermediate element 20*a* encompasses the first carrier profile. Herein the intermediate element 20*a* rests against an outer side of the carrier profile 10*a* with its inner side. In case of a crash/deformation the intermediate element 20*a* can rotate about the carrier profile 10*a* in case of a force impact. As a result of this, in particular torsional loads onto the carrier profile 10*a* are prevented or minimized in case of a crash/deformation.

For connecting the first aircraft seat element 14*a*, the intermediate element 20*a* comprises a first connection ram 52*a*. The first aircraft seat element 14*a* is in a mounted state coupled to the intermediate element 20*a* via the first connection ram 52*a*. The first connection ram 52*a* is made of a plastic material. Principally it is also conceivable that the first connection ram 52*a* is made of another material, e.g. aluminium. Herein the connection ram 52*a* extends in a mounted state toward the first aircraft seat element 14*a*. The connection ram 52*a* is herein connected to the intermediate element 20*a* by substance-to-substance bond. On a first side the connection ram 52*a* comprises a connection region via which the connection ram 52*a* is connected to the intermediate element 20*a*. Herein the connection ram 52*a* is connected to a surface of the intermediate element 20*a* in the connection region via an adhesive bond. The connection region herein has an extension of less than 180 degrees in a circumferential direction. The connection ram 52*a* covers a portion of the intermediate element 20*a* of less than 180 degrees in the circumferential direction. Principally it is also conceivable that the connection ram 52*a* is embodied in a one-part implementation with the intermediate element 20*a*. At a second end the connection ram 52*a* comprises a receptacle 68*a*. The receptacle 68*a* is provided for connecting the first aircraft seat element 14*a* to the connection ram 52*a*. The receptacle 68*a* is embodied by two plates 70*a*, 72*a* each comprising a receiving hole, the receiving holes being oriented in such a way that they are aligned with each other. The first aircraft seat element 14*a* is connected to the connection ram 52*a* via a fastening element 74*a*, which is embodied as a screw and is guided through the two receiving holes of the receptacle 68*a*, and a fastening element embodied as a nut, which is connected to the fastening element 74*a*, which is embodied as a screw. For this purpose the first aircraft seat element 14*a* is oriented with the through-hole of its receptacle 60*a* in such a way that it is aligned between the two receiving holes of the receptacle 68*a* of the first connection ram 52*a*. The fastening element 74*a*, which is embodied as a screw, is guided through the receiving holes of the receptacle 68*a* of the first connection ram 52*a* and through the through-hole of the receptacle 60*a* of the first aircraft seat element 14*a*. The fastening element 74*a*, which is embodied as a screw, is fixated in the receptacle 68*a* of the first connection ram 52*a* and in the receptacle 60*a* of the first aircraft seat element 14*a* by means of the fastening element which is embodied as a nut. It is principally also conceivable that the receptacle 68*a* of the first connection ram 52*a* is implemented differently and the first aircraft seat element 14*a* is connected to the first connection ram 52*a* by means of another fastening method. It is herein conceivable that the fastening element is embodied, for example, as a bolt or pin for a form-fit connection of the first aircraft seat element 14*a*. Principally it is also conceivable that the first aircraft seat element 14*a* is connected to the connection ram 52*a* by means of a plurality of fastening elements 74*a*. Principally it is also conceivable that the aircraft seat element 14*a* is connected to the connection ram 52*a* via a differently implemented form-fit and/or force-fit element.

For connecting the second aircraft seat element 44*a*, the intermediate element 20*a* comprises a second connection ram 54*a*. The second aircraft seat element 44*a* is in a mounted state coupled to the intermediate element 20*a* via the second connection ram 54*a*. the second connection ram 54*a* is made of a plastic material. Principally it is also conceivable that the second connection ram 54a is also made of another material, e.g. aluminium. Herein the second connection ram 54a extends in a mounted state downwards towards the second aircraft seat element 44a. The second connection ram 54a is herein connected to the intermediate element 20a via substance-to-substance bond. On a first side the second connection ram 54a comprises a connection region via which the second connection ram 54a is connected to the intermediate element 20a. The second connection ram 54a is herein connected to a surface of the intermediate element 20a in the connection region via an adhesive bond. The connection region of the second connection ram 54a herein has an extension of less than 180 degrees in a circumferential direction. The second connection ram 54a is herein shifted in an axial direction with respect to the first connection ram 52a. Due to the implementation of the connection regions of the connection rams 52a, 54a, each having an extension of less than 180 degrees in a circumferential direction, it would also be conceivable that the first connection ram 52a and the second connection ram 54a may be arranged on the intermediate element 20a in an identical axial position. The two connection rams 52a, 54a would then be arranged one behind the other in a circumferential direction of the intermediate element 20a. In this way the first aircraft seat element 14a and the second aircraft seat element 44a could be mounted to the carrier profile 10a in an identical axial position. At a second end the second connection ram 54a comprises a receptacle 76a. The receptacle 76a is provided for connecting the second aircraft seat element 44a to the second connection ram 54a. The receptacle 76a is embodied by two plates 78a, 80a, which are arranged spaced apart and each comprise two receiving holes, the two receiving holes in the one plate 78a, 80a being oriented in such a way that they are respectively aligned with one of the receiving holes of the other plate 78a, 80a. By means of two fastening elements 82a, 84a, which are embodied as screws, and two fastening elements embodied as nuts, the second aircraft seat element 44a is connected via its receptacle 62a to the receptacle 76a of the second connection ram 54a. As a result of this, the second aircraft seat element 44a which is embodied as a seat leg is fixedly connected to the intermediate element 20a. It is herein conceivable that the second connection ram 54a, like the first connection ram 52a, may be implemented in a different way for fastening the aircraft seat element 44a.

The intermediate element 20a is fixated in an axial direction with respect to the carrier profile 10a, on which it is arranged. Furthermore the intermediate element 20a is in a normal operating state of the aircraft seat mounting device arranged in a torque-proof manner with respect to the carrier profile 10a. The intermediate element 20a is herein secured against torsion up to a defined maximum load. In a mounted operating state, when ready for operation, the intermediate element 20a is connected to the carrier profile 10a via an adhesive bond. Between an outer side of the carrier profile 10a and an inner side of the intermediate element 20a an adhesive layer is arranged, which connects the carrier profile 10a and the intermediate element 20a to each other via an adhesive bond. The intermediate element 20a is in a normal operating state of the aircraft seat mounting device axially fixated via the adhesive bond. Moreover the intermediate element 20a is arranged on the carrier profile 10a in a torque-proof fashion via the adhesive bond. The intermediate element 20a is in the normal operating state of the aircraft seat mounting device fixedly fixated on the carrier profile 10a. Principally it is also conceivable that for an axial and/or rotatory securing the intermediate element 20a is coupled to the carrier profile 10a in another form-fit and/or forced-fit fashion, e.g. via a form-fit connection, like for example by a pin engaging into the carrier profile 10a and the intermediate element 20a in a form-fit fashion.

As has been described above, in a normal operating state of the aircraft seat mounting device the intermediate element 20a is arranged on the carrier profile 10a in a torque-proof, axially fixated fashion. The normal operating state is implemented by an operating state in which the aircraft seat row 56a, which the aircraft seat mounting device is a part of, is mounted in an aircraft. Herein persons can sit on aircraft seats 58a of the aircraft seat row 56a, resulting in forces being introduced into the aircraft seat 58a and thus into the aircraft seat mounting device via the seat bottom and the backrest. Forces, which are introduced into the first aircraft seat element 14a embodied as a seat divider, are introduced into the second aircraft seat element 44a embodied as a seat leg via the intermediate element 20a. A momentum generated by the forces introduced onto the intermediate element 20a and acting onto the intermediate element 20a is supported against the carrier profile 10a by the connection between the intermediate element 20a and the carrier profile 10a. In case of a crash/deformation, in which accelerating forces exceeding the permitted accelerated forces act onto the aircraft seats 58a of the aircraft seat row 56a and the maximum load is exceeded against which the intermediate element 20a is secured from torsion, the adhesive bond between the intermediate element 20a and the carrier profile 10a shears off and the intermediate element 20a is rotatable with respect to the carrier profile 10a. This allows, in case of a crash/deformation, setting a maximum limit to a torsion load which is transferred onto the carrier profile 10a via the aircraft seat elements 14a, 44a. This is effected by the adhesive bond shearing off at a defined load, the intermediate element 20a being rotatable with respect to the carrier profile 10a, an introduction of a torsional momentum from the aircraft seat elements 14a, 44a into the carrier profile 10a via the intermediate element 20a being thus prevented. As a result of this, the carrier profile 10a can be implemented in a particularly lightweight and material-saving manner, as it does not need to be designed against torsion loads by the aircraft seat elements 14a, 44a in case of crash/deformation.

For connecting the first aircraft seat elements 14a, 16a and the second aircraft seat elements 48a, 50a to the second carrier profile 12a, the aircraft seat mounting device comprises two further intermediate elements 24a, 26a. The two further intermediate elements 24a, 26a are embodied substantially identically to the intermediate elements 20a, 22a for connecting the aircraft seat elements 14a, 16a to the first carrier profile 10a. The aircraft seat elements 14a, 16a are herein also connected to the intermediate elements 24a, 26a via connection rams 98a, 100a, which are not described in detail, wherein once again respectively one first aircraft seat element 14a, 16a and one second aircraft seat element 48a, 50a are connected to one respective intermediate element 24a, 26a. For connecting the exterior first aircraft seat elements 18a, 42a, the aircraft seat mounting device comprises respectively one intermediate element 28a, 32a for connecting to the first carrier profile 10a and respectively one intermediate element 30a, 34a for connection to the second carrier profile 12a. The intermediate elements 28a, 30a, 32a, 34a are embodied equivalent to the other intermediate elements 20a, 22a, 24a, 26a but they each comprise only one connection ram (not shown in detail) for connecting the respective aircraft seat element 18a, 42a to the corresponding intermediate element 28a, 30a, 32a, 34a and thus to the corresponding carrier profile 10a, 12a. The intermediate elements 28a, 30a, 32a, 34a are connected to the corresponding carrier profiles 10a, 12a in a manner equivalent to the other intermediate elements 20a, 22a, 24a, 26a.

Figure 4:
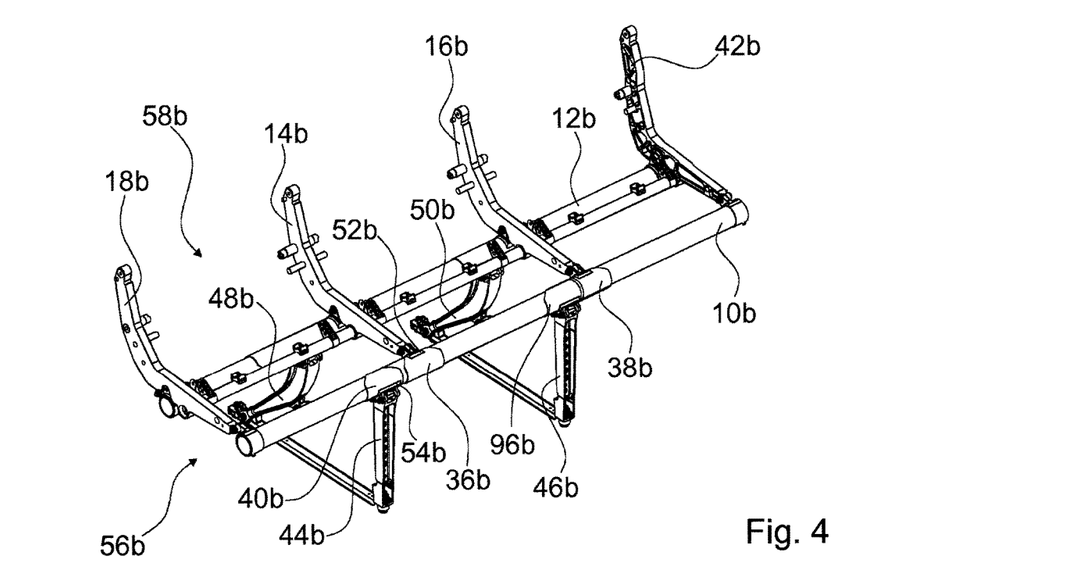
Figure 5:
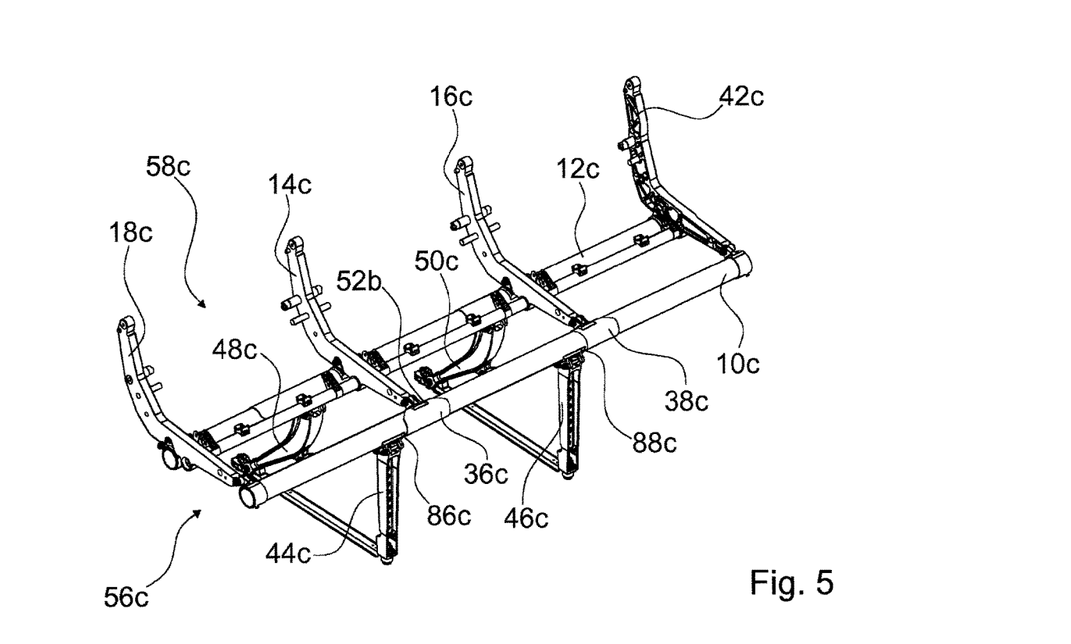
Figure 6:
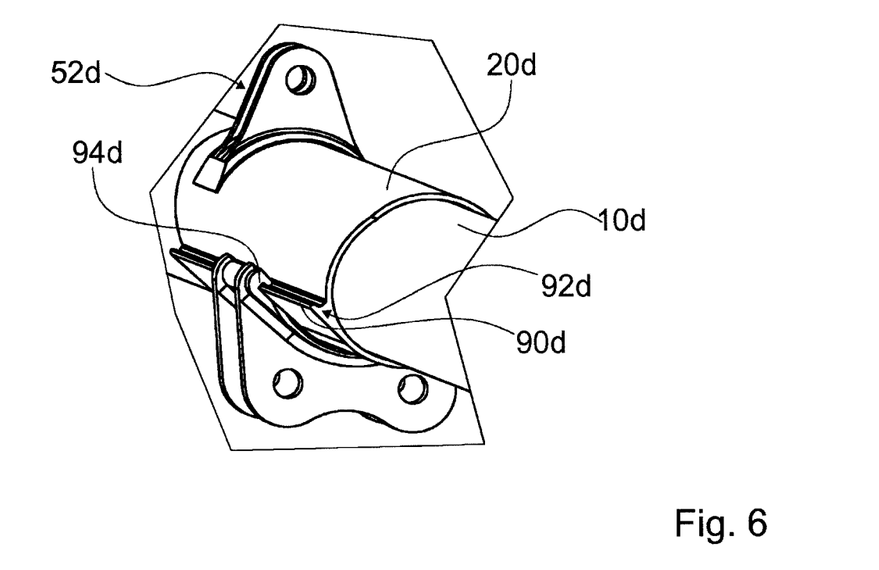

In FIGS. 4 to 6 three further exemplary embodiments of the invention are shown. The following descriptions and the drawings are substantially restricted to the differences between the exemplary embodiments, wherein regarding identically denominated structural components, in particular as regards structural components having the same reference numeral, principally the drawings and/or the description of the other exemplary embodiments, in particular of FIGS. 1 to 3, may be referred to. For distinguishing between the exemplary embodiments, the letter a is set subsequently to the reference numerals of the exemplary embodiment in FIGS. 1 to 3. In the exemplary embodiments of FIGS. 4 to 6, the letter a has been substituted by the letters b to d.

FIG. 4 shows a second exemplary embodiment of an aircraft seat mounting device according to the invention. The aircraft seat mounting device is part of an aircraft seat row 56b, which is only partly shown. The aircraft seat row 56b herein comprises three aircraft seats 58b. The aircraft seat row 56b comprises a first carrier profile 10b. The first carrier profile 10b is embodied as a front cross tube. The aircraft seat mounting device further comprises a second carrier profile 12b. The second carrier profile 12b is embodied as a rear cross tube. The carrier profiles 10b, 12b are made of a light metal. Herein the carrier profiles 10b, 12b are made of an aluminium. Principally it is also conceivable that the carrier profiles 10b, 12b are made of another lightweight material, e.g. of a magnesium or titane.

The aircraft seat mounting device comprises four first aircraft seat elements 14b, 16b, 18b, 42b. The first aircraft seat elements 14b, 16b, 18b, 42b are each embodied as a seat divider. The first aircraft seat elements 14b, 16b, 18b, 42b embodied as seat dividers respectively delimit a seating region of an aircraft seat 58b. The first aircraft seat elements 14b, 16b, 18b, 42b embodied as seat dividers are herein embodied substantially identically to those of the first exemplary embodiment of FIGS. 1 to 3. The aircraft seat mounting device comprises four second aircraft seat elements 44b, 46b, 48b, 50b. The second aircraft seat elements 44b, 46b, 48b, 50b are herein respectively embodied as a seat leg. The second aircraft seat elements 44b, 46b, 48b, 50b embodied as seat legs are provided for mounting the aircraft seat mounting device and thus the aircraft seat row 56b onto the mounting plane. The second aircraft seat elements 44b, 46b, 48b, 50b are herein embodied substantially equivalently to the first exemplary embodiment of FIGS. 1 to 3.

The aircraft seat mounting device comprises two first intermediate elements 36b, 38b and two second intermediate elements 40b, 96b. The intermediate elements 36b, 38b, 40b, 96b are herein implemented as tube elements like in the first exemplary embodiment. In contrast to the intermediate elements of the first exemplary embodiment, respectively only one aircraft seat element 14b, 16b, 44b, 46b is coupled to the first and second intermediate elements 36b, 38b, 40b, 96b. An implementation of the two first intermediate elements 36b, 38b and an implementation of the two second intermediate elements 40b, 96b as well as a connection of the respective first aircraft seat element 14b, 16b or the respective second aircraft seat element 44b, 46b to the corresponding intermediate element 36b, 38b, 40b, 96b are identical, which is why in the following merely a first intermediate element 36b and a second intermediate element 40b as well as the connection of the respective first aircraft seat element 14b, 16b respectively of the respective second aircraft seat element 44b, 46b to the corresponding intermediate element 36b, 38b, 40b, 96b will be described. This will allow deducing a description of the corresponding other intermediate element 38b, 96b.

The first intermediate element 36b is provided for connecting the first aircraft seat element 14b to the carrier profile 10b. For this purpose the first intermediate element 36b comprises a connection ram 52b. The one connection ram 52b is embodied in the same way as the corresponding connection ram for connecting the first aircraft seat element of the first exemplary embodiment of FIGS. 1 to 3. The first aircraft seat element 14b is in a fully mounted state connected to the first intermediate element 36b via a screw connection and is thus coupled to the first carrier profile 10b. The first intermediate element 36b is herein connected to the carrier profile by an adhesive bond, i.e. in the same way as the intermediate elements of the first exemplary embodiment.

The second intermediate element 40b is provided for connecting the second aircraft seat element 44b to the carrier profile 10b. For this purpose the second intermediate element 40b comprises a connection ram 54b. The one connection ram 54b is implemented in the same way as the corresponding connection ram for connecting the second aircraft seat element of the first exemplary embodiment of FIGS. 1 to 3. The second aircraft seat element 44b is in a fully mounted state connected to the second intermediate element 40b via a screw connection and is thus coupled to the first carrier profile 10b. The second intermediate element 40b is herein connected to the carrier profile via an adhesive bond, in the same way as the intermediate elements of the first exemplary embodiment. Herein the second intermediate element 40b is arranged spaced apart from the first intermediate element 36b. The first intermediate element 36b and the second intermediate element 40b are herein independent from each other. It is herein principally conceivable that the two intermediate elements 36b, 40b are connected to the carrier profile 10b by adhesive bonds of differing strengths, such that the two intermediate elements 36b, 40b are rotatable with respect to the carrier profile 10b from differing sizes of loads.

FIG. 5 shows a third exemplary embodiment of an aircraft seat mounting device according to the invention. The aircraft seat mounting device is part of an only partly shown aircraft seat row 56c. The aircraft seat row 56c herein comprises three aircraft seats 58c. The aircraft seat mounting device comprises a first carrier profile 10c. The first carrier profile 10c is embodied as a front cross tube. The aircraft seat mounting device further comprises a second carrier profile 12c. The second carrier profile 12c is embodied as a rear cross tube. The carrier profiles 10c, 12c are made of a light metal.

The aircraft seat mounting device comprises four first aircraft seat elements 14c, 16c, 18c, 42c. The first aircraft seat elements 14c, 16c, 18c, 42c are each embodied as a seat divider. The first aircraft seat elements 14c, 16c, 18c, 42c which are embodied as seat dividers respectively delimit a seating region of an aircraft seat 58c. The first aircraft seat elements 14c, 16c, 18c, 42c embodied as seat dividers are herein implemented in substantially the same way as those of the first exemplary embodiment of FIGS. 1 to 3. The aircraft seat mounting device comprises four second aircraft seat elements 44c, 46c, 48c, 50c. The second aircraft seat elements 44c, 46c, 48c, 50c are herein each embodied as a seat leg. The second aircraft seat elements 44c, 46c, 48c, 50c which are embodied as seat legs are provided for mounting the aircraft seat mounting device and thus the aircraft seat row 56c onto the mounting plane. The second aircraft seat elements 44c, 46c, 48c, 50c are herein implemented in substantially the same way as in the first exemplary embodiment of FIGS. 1 to 3.

The aircraft seat mounting device comprises two first intermediate elements 36c, 38c. The two first intermediate elements 36c, 38c are herein embodied equivalently to the two first intermediate elements of the second exemplary embodiment of FIG. 4. The two first intermediate elements 36c, 38c are herein provided for connecting respectively one first aircraft seat element 14c, 16c embodied as a seat divider to the carrier profile 10c. For this purpose respectively one first aircraft seat element 14c, 16c embodied as a seat divider is coupled to the corresponding intermediate element 36c, 38c via a connection ram 52c.

The second aircraft seat elements 44c, 46c which are embodied as seat legs are directly coupled to the carrier profile 10c. For this purpose the carrier profile 10c forms respectively one connection ram 86c, 88c, via which the second aircraft seat elements 44c, 46c are fixedly connected to the carrier profile 10c. Herein there is no intermediate element between the second aircraft seat elements 44c, 46c and the carrier profile 10c, which is implemented to be rotatable in case of crash/deformation with respect to the carrier profile 10c. Principally it is herein also conceivable that the second aircraft seat elements 44c, 46c embodied as seat legs are connected to the carrier profile 10c in a loop-around manner as is known from the state of the art.

Principally there would also an implementation be conceivable, in which a connection of the first aircraft seat elements 14c, 16c and the second aircraft seat elements 44c, 46c is embodied vice versa to the one described above. Herein the first aircraft seat elements 14c, 16c embodied as seat dividers would be connected to the carrier profile 10c directly and rigidly via a loop-around or via a connection ram formed by the carrier profile 10c, while the second aircraft seat elements 44c, 46c embodied as seat legs would be connected to the carrier profile 10c via two intermediate elements and would thus be arranged rotatably with respect to the carrier profile 10c at least in case of crash/deformation.

FIG. 6 shows a fourth exemplary embodiment of an aircraft seat mounting device according to the invention. The aircraft seat mounting device is part of an aircraft seat row 56d, which is only partly shown. The aircraft seat row 56d herein comprises three aircraft seats 58d. The aircraft seat mounting device comprises a first carrier profile 10d. The first carrier profile 10d is embodied as a front cross tube. The aircraft seat mounting device further comprises a second carrier profile, which is not shown in detail. The carrier profiles are made of a light metal. The aircraft seat device comprises, like the other exemplary embodiments, first and second aircraft seat elements, which are in this case not shown in detail.

The aircraft seat mounting device comprises, equivalently to the first exemplary embodiment, a first intermediate element 20d and a second intermediate element, wherein only the first intermediate element 20d is shown and will be described in the following. The second intermediate element, which is not shown in detail, is embodied equivalently. The intermediate element 20d is implemented partly differing from the first exemplary embodiment. Equivalently to the first exemplary embodiment, the intermediate element 20d comprises, for the purpose of connecting a first aircraft seat element, a first connection ram 52d, which is connected to the intermediate element 20d via an adhesive bond. The first connection ram 52d is embodied identically to the corresponding connection ram of the first exemplary embodiment. For connecting the second aircraft seat element, which is embodied as a seat leg, the intermediate element 20d comprises a second connection ram 54d, which differs from the one of the first exemplary embodiment. The second connection ram 54d is connected to the intermediate element 20d via an adhesive bond and a form-fit connection. Principally it would also be conceivable that the second connection ram 54d is connected to the second intermediate element only via a form-fit connection. For the form-fit connection of the connection ram 54d, the intermediate element 20d forms a form-fit element 90d. The form-fit element 90d of the intermediate element 20d is implemented as a protrusion having an undercut 92d. The connection ram 54d forms a form-fit element 94d, which is implemented corresponding to the form-fit element 90d of the intermediate element 20d. The form-fit element 94d of the connection ram 54d is embodied as a hook. The form-fit element 94d embodied as a hook engages in a mounted state into the form-fit element 90d of the intermediate element 20d. In this way a particularly fix and rigid connection is achievable between the intermediate element 20d and the second connection ram 54d. This allows connecting the second aircraft seat element embodied as a seat leg to be connected to the intermediate element 20d and thus to the carrier profile 10d in a particularly fixed and reliable fashion. The adhesive bond between the intermediate element 20d and the second connection ram 54d is advantageously reinforced by the form-fit connection of the form-fit element 94d of the connection ram 54d and the form-fit element 90d of the intermediate element 20d.

REFERENCE NUMERALS 10 carrier profile
12 carrier profile
14 aircraft seat element
16 aircraft seat element
18 aircraft seat element
20 intermediate element
22 intermediate element
24 intermediate element
26 intermediate element
28 intermediate element
30 intermediate element
32 intermediate element
34 intermediate element
36 intermediate element
38 intermediate element
40 intermediate element
42 aircraft seat element
44 aircraft seat element
46 aircraft seat element
48 aircraft seat element
50 aircraft seat element
52 connection ram
54 connection ram
56 aircraft seat row
58 aircraft seat
60 receptacle
62 receptacle
64 connecting rod
66 connecting rod
68 receptacle
70 plate
72 plate
74 fastening element 76 receptacle
78 plate
80 plate
82 fastening element
84 fastening element
86 connection ram
88 connection ram
90 form-fit element
92 undercut
94 form-fit element
96 intermediate element
98 connection ram
100 connection ram

The invention claimed is:

1. An aircraft seat mounting device, comprising:
    at least one carrier profile;
    at least one aircraft seat element, which is embodied as a seat divider or a seat leg; and
    at least one intermediate element, which at least substantially encompasses the at least one carrier profile and is coupled to the at least one aircraft seat element, wherein
    the intermediate element encompasses the carrier profile at least by more than 270 degrees and is arranged rotatably with respect to the carrier profile at least in case of crash or deformation.

2. The aircraft seat mounting device according to claim 1, comprising
    at least one further aircraft seat element, which is coupled to the intermediate element.

3. The aircraft seat mounting device according to claim 1, wherein
    the intermediate element comprises at least one connection ram, via which the aircraft seat element is coupled to the intermediate element.

4. The aircraft seat mounting device according to claim 3, wherein
    the connection ram is coupled to the intermediate element via substance-to-substance bond.

5. The aircraft seat mounting device according to claim 4, wherein
    the connection ram has, in a connection region with the intermediate element, an extension in a circumferential direction which is less than 180 degrees.

6. The aircraft seat mounting device according to claim 3, wherein
    the connection ram has, in a connection region with the intermediate element, an extension in a circumferential direction which is less than 180 degrees.

7. The aircraft seat mounting device according to claim 1, wherein
    the at least one intermediate element is fixated with respect to the carrier profile at least in an axial direction.

8. The aircraft seat mounting device according to claim 1, wherein
    the intermediate element is arranged in a torque-proof fashion with respect to the carrier profile at least in one operating state.

9. The aircraft seat mounting device according to claim 1, wherein
    the intermediate element is fixedly connected to the carrier profile by means of an adhesive bond at least in one operating state.

10. The aircraft seat mounting device according to claim 1, wherein
    the carrier profile is at least substantially made of a light metal or of a fiber-composite material.

11. The aircraft seat mounting device at least according to claim 1, comprising
    at least one second intermediate element, wherein respectively only one aircraft seat element is coupled to one of the two intermediate elements.

12. The aircraft seat mounting device at least according to claim 1, comprising
    at least one further aircraft seat element, which is directly coupled to the carrier profile.

13. The aircraft seat mounting device according claim 2, wherein
    the aircraft seat element is embodied as a seat divider.

14. The aircraft seat mounting device according to claim 2, wherein
    the aircraft seat element is embodied as a seat leg.

15. The aircraft seat mounting device according to claim 2, wherein
    the intermediate element comprises at least one connection ram, via which the aircraft seat element is coupled to the intermediate element.

16. The aircraft seat mounting device according to claim 2, wherein
    the at least one intermediate element is fixated with respect to the carrier profile at least in an axial direction.

17. The aircraft seat mounting device according to claim 2, wherein
    the intermediate element is arranged in a torque-proof fashion with respect to the carrier profile at least in one operating state.

18. An aircraft seat comprising an aircraft seat mounting device, the aircraft seat mounting device comprising:
    at least one carrier profile;
    at least one aircraft seat element, which is embodied as a seat divider or a seat leg; and
    at least one intermediate element, which at least substantially encompasses the at least one carrier profile and is coupled to the at least one aircraft seat element, wherein
    the intermediate element encompasses the carrier profile at least by more than 270 degrees and is arranged rotatably with respect to the carrier profile at least in case of crash or deformation.

19. An aircraft seat mounting device, comprising:
    at least one carrier profile;
    at least one aircraft seat element, which is embodied as a seat divider or a seat leg; and
    at least one intermediate element, which at least substantially encompasses the at least one carrier profile and is coupled to the at least one aircraft seat element, wherein
    the intermediate element is arranged rotatably with respect to the carrier profile at least in case of crash or deformation, whereby torsional loads onto the carrier profile are prevented or minimized.

* * * * *